(12) United States Patent
Liu et al.

(10) Patent No.: US 10,602,318 B2
(45) Date of Patent: Mar. 24, 2020

(54) METHOD, APPARATUS AND NETWORK DEVICE FOR USER DATA TRANSMISSION

(71) Applicant: Huawei Technologies Co., Ltd., Shenzhen (CN)

(72) Inventors: Yalin Liu, Shenzhen (CN); Jiayin Zhang, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 15/130,598

(22) Filed: Apr. 15, 2016

(65) Prior Publication Data

US 2016/0234657 A1 Aug. 11, 2016

Related U.S. Application Data

(63) Continuation of application No. PCT/CN2013/085369, filed on Oct. 17, 2013.

(51) Int. Cl.
*H04W 4/06* (2009.01)
*H04W 74/06* (2009.01)
(Continued)

(52) U.S. Cl.
CPC ............ *H04W 4/06* (2013.01); *H04L 47/24* (2013.01); *H04L 47/6275* (2013.01);
(Continued)

(58) Field of Classification Search
CPC ........ H04W 4/06; H04W 74/06; H04L 47/24; H04L 47/6275; H04L 63/104; H04L 67/22
See application file for complete search history.

(56) References Cited

U.S. PATENT DOCUMENTS 7,356,010 B2 4/2008 He et al.
2007/0002800 A1* 1/2007 Sondur ............... H04L 27/2657
370/332

(Continued)

FOREIGN PATENT DOCUMENTS

CN 101242384 A 8/2008
CN 101494908 A 7/2009
(Continued)

*Primary Examiner* — Brandon M Renner
*Assistant Examiner* — Jay L Vogel
(74) *Attorney, Agent, or Firm* — Leydig, Voit & Mayer, Ltd.

(57) ABSTRACT

A method, an apparatus and a network device for user data transmission are provided, where the method includes: transmitting a multicast frame for acquiring a user scheduling request to users in a user group, the multicast frame includes a long training sequence and a spread spectrum sequence(s) allocated to all users in the user group; receiving the user scheduling request(s) fed back by a user(s) with data transmission in the user group, the user scheduling request(s) is fed back by the user(s) using at least one of the long training sequence(s) and the spread spectrum sequence(s) allocated to the user(s); scheduling user data transmission according to the user scheduling request(s). According to embodiments of the present disclosure, the delay of users with data transmission is reduced, and the quality of service for the system is improved.

8 Claims, 5 Drawing Sheets

(51) Int. Cl.
    *H04L 29/08*       (2006.01)
    *H04L 29/06*       (2006.01)
    *H04L 12/865*      (2013.01)
    *H04L 12/851*      (2013.01)
(52) U.S. Cl.
    CPC ............ *H04L 63/104* (2013.01); *H04L 67/22*
                     (2013.01); *H04W 74/06* (2013.01)

(56) References Cited

U.S. PATENT DOCUMENTS

| | | | |
|---|---|---|---|
| 2007/0115905 A1 | 5/2007 | Jokela et al. | |
| 2010/0162318 A1 | 6/2010 | Smith | |
| 2011/0128947 A1* | 6/2011 | Liu | H04L 25/03343 370/338 |
| 2011/0194475 A1* | 8/2011 | Kim | H04L 1/0053 370/311 |
| 2013/0136066 A1* | 5/2013 | Kim | H04W 72/10 370/329 |
| 2013/0294427 A1* | 11/2013 | Kim | H04W 16/14 370/338 |
| 2014/0064261 A1* | 3/2014 | Wang | H04W 40/02 370/338 |

FOREIGN PATENT DOCUMENTS

| | | |
|---|---|---|
| CN | 102014509 A | 4/2011 |
| CN | 101286980 B | 3/2012 |

\* cited by examiner

METHOD, APPARATUS AND NETWORK DEVICE FOR USER DATA TRANSMISSION

CROSS-REFERENCE TO RELATED APPLICATION

This application is a continuation of International Patent Application No. PCT/CN2013/085369, filed on Oct. 17, 2013, which is hereby incorporated by reference in its entirety.

TECHNICAL FIELD

The disclosure relates to the field of wireless network technology and, in particular, to a method, apparatus and network device for user data transmission.

BACKGROUND

With the wide application of intelligent terminals, there has been an ever increasing demand for network traffic, and in order to meet the needs of people to access the internet anytime and anywhere, performance of the network system must be improved, based on which the wireless fidelity (Wi-Fi) system in a wireless local area network evolved from IEEE 802.11a/b to 802.11g and 802.11n, and then evolved from 802.11g and 802.11n to 802.11ac.

IEEE 802.11n is provided with distributed coordination function (DCF, distributed coordination function), point coordination function (PCF, point coordination function), hybrid coordination function (HCF, hybrid coordination function), and enhanced distributed channel access (EDCA, enhanced distributed channel access) technology. As to the distributed coordination function, users access the channel through competition, and only the user that acquires a channel is allowed to transmit data; as to the point coordination function, user begins to transmit data after receiving a poll from an access point (AP, access point), where the transmission duration is one frame; and as to the hybrid coordination function, user begins to transmit data after receiving a poll from the AP, where the transmission duration is one or multiple frames.

During the research and practice on the prior art, the inventor finds that, in the existed technology, the AP can query only one user every time to find out whether scheduling is requested, in other words, the AP can only query one user each time to find out whether there is data to transmit, thus increasing the data transmission delay for the user, and lowering the service quality of the system.

SUMMARY

Embodiments of the disclosure provide a method, apparatus and network device for user data transmission, so as to address the technical problem of increased probability of invalid poll and delayed user data transmission, which is caused by that each time only one user can be queried about whether a scheduling request exists in the prior art.

In order to solve the technical problem above, the embodiments of the disclosure discloses the following technical schemes.

A method for user data transmission is provided in a first aspect, and the method includes:

transmitting a multicast frame for acquiring a user scheduling request(s) to users in a user group, where the multicast frame includes a long training sequence(s) and a spread spectrum sequence(s) allocated to all users in the user group;

receiving the user scheduling request(s) fed back by a user(s) with data transmission in the user group, where the user scheduling request(s) is fed back by the user(s) using at least one of the long training sequence(s) and the spread spectrum sequence(s) allocated to the user(s); and scheduling user data transmission according to the user scheduling request(s).

In a first possible implementation of the first aspect, the method also includes:

acquiring user information and system information, where the system information includes: the quantity of users associated with the AP;

grouping the quantity of the users associated with the AP according to the user information, and setting user group IDs; and allocating a long training sequence(s) and a spread spectrum sequence(s) to users in each user group.

With reference to the first aspect or the first possible implementation of the first aspect, in a second possible implementation, the user information includes at least one of traffic type of user, association identifier information (AID) of user and location information of user.

With reference to the first aspect or the first or the second possible implementation of the first aspect, in a third possible implementation, the allocating the long training sequence(s) to the users in each user group includes:

allocating a same long training sequence to the users in all the user groups; or, selecting different base sequences as the long training sequences for different user groups, and using different shifts of a same base sequence as the long training sequence for different users in the same group.

With reference to the first aspect or the first, the second or the third possible implementation of the first aspect, in a fourth possible implementation, the allocating the spread spectrum sequence(s) to the users in each user group includes:

allocating orthogonal spread spectrum sequences to users in the same user group; and allocating orthogonal spread spectrum sequences or non-orthogonal spread spectrum sequences, or a same spread spectrum sequence to each user group in different user groups.

With reference to the first aspect or the first, the second, the third or the fourth possible implementation of the first aspect, in a fifth possible implementation, the multicast frame also includes an identifier indicating the user information of the user group.

With reference to the first aspect or the first, the second, the third, the fourth or the fifth possible implementation of the first aspect, in a sixth possible implementation, the identifier indicating the user information of the user groups include a group ID of the user group, AID information of the users in the user groups, or a base sequence identifier(s) of the long training sequence(s) of the users in the user groups.

With reference to the first aspect or the first, the second, the third, the fourth, the fifth or the sixth possible implementation of the first aspect, in a seventh possible implementation, the method also includes:

receiving feedback information transmitted by a user(s) without data transmission in the user groups in response to the multicast frame.

An apparatus for user data transmission provided by a second aspect includes:

a transmitting unit, configured to transmit a multicast frame for acquiring a user scheduling request(s) to users in a predetermined user group, where the multicast frame includes a long training sequence(s) and a spread spectrum sequence(s) allocated to the users in the user group;

a first receiving unit, configured to receive the user scheduling request(s) fed back by a user(s) with data transmission in the user group, where the user scheduling request(s) is fed back by the user(s) using at least one of the long training sequence(s) and the spread spectrum sequence(s) allocated to the user(s); and a scheduling unit, configured to schedule user data transmission according to the user scheduling request(s).

In a first possible implementation of the second aspect, the apparatus also includes:

an acquiring unit, configured to acquire user information and system information, where the system information includes: the quantity of users associated with an access point (AP);

a dividing unit, configured to group the quantity of users associated with the AP according to the user information, and set user group IDs; and an allocating unit, configured to allocate a long training sequence(s) and a spread spectrum sequence(s) to users in each user group.

With reference to the second aspect or the first possible implementation of the second aspect, in a second possible implementation, the user information acquired by the acquiring unit includes at least one of traffic type of user, association identifier information (AID) of user and location information of user.

With reference to the second aspect or the first or the second possible implementation of the second aspect, in a third possible implementation, the allocating unit includes:

a long training sequence allocating unit, configured to allocate a same long training sequence to the users in all the user groups; or, select different base sequences as the long training sequences for different user groups, and use different shifts of a same base sequence as the long training sequence for different users in the same group; and a spread spectrum sequence allocating unit, configured to allocate orthogonal spread spectrum sequences to users in the same user group; and allocating orthogonal spread spectrum sequences or non-orthogonal spread spectrum sequences, or a same spread spectrum sequence to each user group in different user groups.

With reference to the second aspect or the first, the second or the third possible implementation of the second aspect, in a fourth possible implementation, the multicast frame transmitted by the transmitting unit also includes an identifier indicating the user information of the user group.

With reference to the second aspect or the first, the second, the third or the fourth possible implementation of the second aspect, in a fifth possible implementation, the identifier indicating the user information of the user groups transmitted by the transmitting unit includes a group ID of the user group, AID information of the users in the user groups, or a base sequence identifier(s) of the long training sequence(s) of the users in the user groups.

With reference to the second aspect or the first, the second, the third, the fourth or the fifth possible implementation of the second aspect, in a sixth possible implementation, the apparatus also includes:

a second receiving unit, configured to receive feedback information transmitted by a user(s) without data transmission in the user groups in response to the multicast frame.

A network device provided by a third aspect includes:

a transmitter, configured to transmit a multicast frame for acquiring a user scheduling request(s) to users in a user group, where the multicast frame includes a long training sequence(s) and a spread spectrum sequence(s) allocated to all users in the user group;

a receiver, configured to receive the user scheduling request(s) fed back by a user(s) with data transmission in the user group, where the user scheduling request(s) is fed back by the user(s) using at least one of the long training sequence(s) and the spread spectrum sequence(s) allocated to the user(s); and a processor, configured to schedule user data transmission according to the user scheduling request(s) received by the receiver.

In a first possible implementation of the third aspect, the receiver is also configured to receive user information and system information, where the system information includes: the quantity of users associated with an access point (AP); and the processor is also configured to group the quantity of the users associated with the AP according to the user information, and set user group IDs; and allocating a long training sequence(s) and a spread spectrum sequence(s) to users in each user group.

With reference to the third aspect or the first possible implementation of the third aspect, in a second possible implementation, the user information received by the receiver includes traffic type of user, association identifier information (AID) of user or location information of user.

With reference to the third aspect or the first or the second possible implementation of the third aspect, in a third possible implementation, the allocating the long training sequence(s) to the users in each user group by the processor, includes: allocating a same long training sequence to the users in all the user groups; or, selecting different base sequences as the long training sequences for different user groups, and using different shifts of a same base sequence as the long training sequences for different users in the same group.

With reference to the third aspect or the first, the second or the third possible implementation of the third aspect, in a fourth possible implementation, the allocating the spread spectrum sequence(s) to the users in each user group by the processor includes: the processor allocates orthogonal spread spectrum sequences to users in the same user group; and allocates orthogonal spread spectrum sequences or non-orthogonal spread spectrum sequences, or a same spread spectrum sequence to each user group in the different user groups.

With reference to the third aspect or the first, the second, the third or the fourth possible implementation of the third aspect, in a fifth possible implementation, the multicast frame transmitted by the transmitter also includes an identifier indicating the user information of the user group.

With reference to the third aspect or the first, the second, the third, the fourth or the fifth possible implementation of the third aspect, in a sixth possible implementation, the receiver is also configured to receive feedback information transmitted by a user(s) without data transmission in the user groups in response to the multicast frame.

It can be concluded from the technical schemes above that, in embodiments of the present disclosure, the AP is able to poll multiple users each time, reduce probability of invalid poll, and acquire the user scheduling requests of multiple users, and schedule user data transmission based on the user scheduling request, thereby reducing the delay of users with data transmission, and thus improve the quality of service for the system.

BRIEF DESCRIPTION OF THE DRAWINGS

In order to describe technical solutions in embodiments of the present disclosure more clearly, accompanying drawings used in the description of embodiments of the present disclosure will be briefly described hereunder. Obviously, the described drawings are merely some embodiments of present disclosure. For persons skilled in the art, other drawings may be obtained based on these drawings without any creative effort.

DESCRIPTION OF EMBODIMENTS

Hereafter the technical schemes in the embodiments of the present disclosure will be clearly and completely described with reference to the drawings in the embodiments of the present disclosure; obviously, the described embodiments are only a portion rather than all of the embodiments of the present disclosure. On the basis of embodiments of the disclosure, all other embodiments achieved by those skilled in the art without creative work shall fall within the protection scope of the present disclosure.

Embodiments of the present disclosure provide a method and an apparatus for acquiring user scheduling requests, which are used in a wireless local area network. In embodiments of the present disclosure, an access point (AP) groups users associated with it according to predetermined rules, then respectively transmits a multicast frame for "acquiring user scheduling request" to the users in each group, and schedules subsequent user data transmissions based on feedback information after receiving the feedback information transmitted by multiple users in each group. In embodiments of the present disclosure, it is able to poll multiple users each time, thus the probability of invalid poll is reduced, besides, the user scheduling requests of multiple users can be acquired simultaneously, and thus user data transmission can be adjusted according to these user scheduling requests, thereby reducing the delay of users with data transmission, and improving the quality of service for the system.

Figure 1:
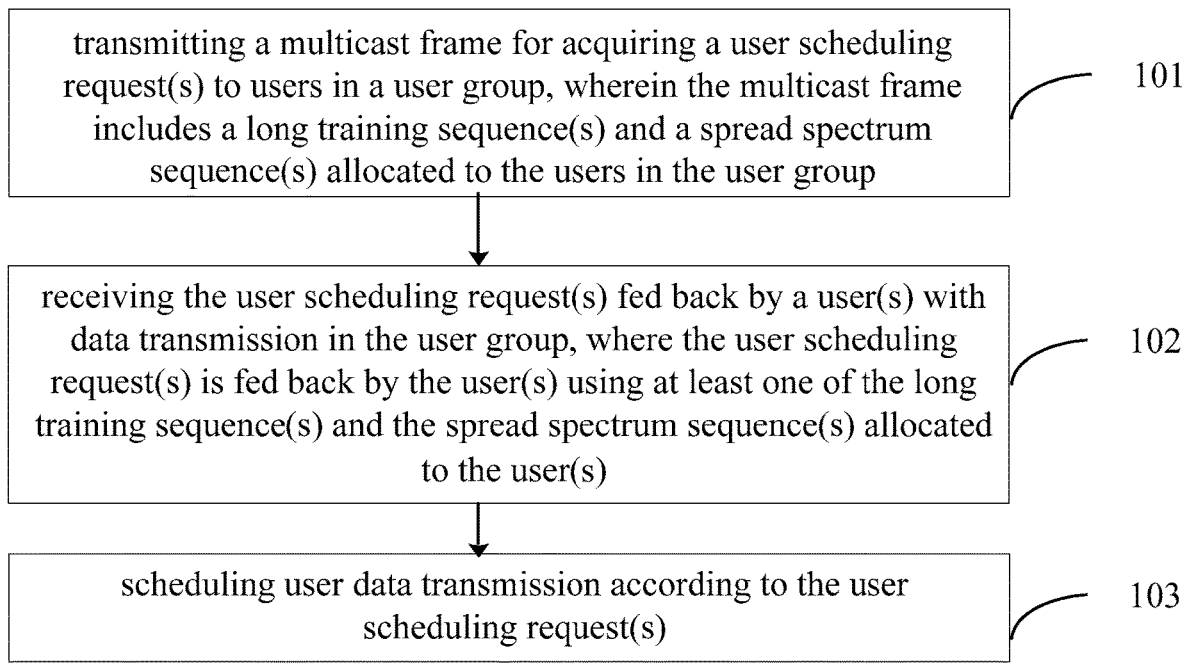
FIG. 1 is a flow chart of a method for user data transmission provided by an embodiment of the present disclosure.

Referring to FIG. 1, where FIG. 1 is a flow chart of a method for acquiring a user scheduling request provided by an embodiment of the present disclosure, and the method includes:

Step 101: transmitting a multicast frame for acquiring a user scheduling request(s) to users in a user group, where the multicast frame includes a long training sequence(s) and a spread spectrum sequence(s) allocated to users in the user group;

before the above step, the method may also include: acquiring, by an access point (AP), user information and system information firstly, where the system information includes: users (or the quantity of stations (STA)) associated with the AP; then, according to the user information, grouping the quantity of the users associated with the AP, and setting user group IDs; and allocating a long training sequence and a spread spectrum sequence to users in each user group.

Besides the quantity of STAs associated with the AP, the system information may also include BSS ID and the like, and of course, may also adaptively include other parameters, for which the embodiment makes no restriction.

Optionally, in this embodiment, if the user information includes traffic type of user, then the grouping the quantity of the users associated with the AP according to the user information includes: grouping the quantity of the users associated with the AP according to the traffic type of user. When the grouping is conducted according to the traffic type of user, user groups may be divided into high priority traffic groups, medium priority traffic groups and low priority traffic groups according to the priority of the traffic; and it is possible to make distinctions in more granular levels, where the groups are divided into five groups ranking from priority 1 to priority 5. The high priority traffic groups may have more opportunities to transmit data than the low priority traffic groups, for instance, the times of broadcasting by the AP to the high priority traffic groups are more than that to the low priority traffic groups. For the group IDs, one case is that the priorities of the traffics may be taken as the group IDs, such as 01, 02, 03 and etc., but it is not limited to this.

If the user information includes association identifier information (AID) of the user, then the grouping the quantity of the users associated with the AP according to the user information includes: grouping the quantity of the users associated with the AP according to the AID of user.

When the grouping is conducted according to the AID of user, users with adjacent AIDs may be put into a group, for example, the users with the AIDs of 1 to 20 are put into a first group, and so on. For the group IDs, the initial addresses of the AIDs in groups may be taken as the group IDs, or the group IDs may be set in a simple way, such as 1, 2, 3 and etc., but it is not limited to this.

If the user information includes location information of user, then the grouping the quantity of the users associated with the AP according to the user information includes: grouping the quantity of the users associated with the AP according to the location information of user.

When the grouping is conducted according to the location information of the users, users with adjacent locations may be put into a group, or users located in the same direction (e.g. above, below, northeast, southwest) of the AP may be put into a group, so that the AP can transmit broadcast information to the users in a certain user group in the form of beamforming. The group IDs may be set in a simple way, such as 1, 2, 3 and etc., but it is not limited to this.

Of course, in this embodiment, the grouping may also be conducted in other manners, and the group IDs are also set. There are a variety of ways to group the users, and different grouping methods may be selected according to the needs, among which, for instance, in order to reduce the power consumption of the AP, the approach of grouping according to the location of user may be selected, thereby allowing the AP to perform multicast in the form of beamforming.

Optionally, the approach of allocating the long training sequence to the users are exemplified by but not limited to the two approaches below:

Approach 1: the same long training sequence may be allocated to the users in all the user groups according to the IEEE 802.11n or the IEEE 802.11ac standard.

Approach 2: different long training sequences may be allocated to different users. In the embodiments of the present disclosure, the long training sequences may be allocated to different users in accordance with the following rules for the configuration of the multicast frame. Rule 1: different user groups select different base sequences as the long training sequences; Rule 2: different users in the same user group use different shifts of the same base sequence as the long training sequences. To be clear, the selection and use of the long training sequences are well-known technology to those skilled in the art, and will not be repeated herein.

Optionally, allocating the spread spectrum sequence to the users in each user group includes: allocating orthogonal spread spectrum sequences to the users in the same user group, and allocating orthogonal spread spectrum sequences or non-orthogonal spread spectrum sequences, or a same spread spectrum sequence to each group of users among different user groups; where allocating the spread spectrum sequences to the users in each user group can also be referred to as allocating spread spectrum codes to the users in each user group.

In this embodiment, the purpose of allocating the spread spectrum codes or the spread spectrum sequences is: the users feed back the information of whether there is data to be transmitted to the AP by using the allocated spread spectrum codes; and the AP can correctly demodulate each user's feedback information when multiple users in the same group feed back the broadcast frame at the same time. Two rules need to be complied with when conducting Approach 2, where Rule 1: the spread spectrum codes of different users in the same group must be orthogonal; and Rule 2: the spread spectrum codes of the users in different groups may be non-orthogonal, orthogonal, or the same.

In this embodiment, bits capable of identifying information of the group of users are included in a target user field of the transmitted multicast frame, if the group is group $i^{th}$, then in the target user field of the transmitted multicast frame, the group ID of the users in group $i^{th}$ is added; or the AID information of the users in group $i^{th}$ is added, where the adding approach has two expression methods, one is using an initial value of the AID and the quantity of users in the group, and the other is using an initial value and an ending value of the AID of the users in the group. Of course, in the practical application, the AID information can only be used to identify the users in each group when the users are grouped according to the AID; or the base sequence ID of the long training sequence of the users in group $i^{th}$ is added. If different long training sequences are allocated to different users, please refer to the above descriptions for the specific allocation rules, then the base sequence ID of the long training sequences may be used to identify each group of users.

In this embodiment, for contents in other fields of the multicast frame, reference may be made to the design method of a PCF poll frame in the IEEE 802.11ac.

Based on the above process, in step 101, in the case of conducting grouping according to the location of user, the AP may transmit the multicast frame (or multicast information) in the form of beamforming. To be clear, the modulation and coding approach and transmission power of the multicast frame should ensure that all users in the group are able to receive and correctly demodulate the content of the multicast frame.

Step 102: receiving the user scheduling request(s) fed back by a user(s) with data transmission in the user group, where the user scheduling request(s) is fed back by the user(s) using at least one of the long training sequence(s) and the spread spectrum sequence(s) allocated to the user(s).

That is to say, the feedback is conducted using the spread spectrum sequence if all users use the same long training sequence; and the feedback may be conducted using the long training sequences if different users use different long training sequences.

After receiving the multicast frame transmitted by the AP, each user in the user group uses a spread spectrum code allocated by the system to feed back information of whether there is data to be transmitted to the AP, so that the AP can correctly demodulate each user's feedback information when multiple users in the same group feed back in response to the information of the multicast frame at the same time, if there is data to be transmitted, a user scheduling request is included in the feedback information; if there is no data to be transmitted, the user scheduling request is not included in the feedback information. The allocation of the spread spectrum codes may be conducted in the multicast frame or in advance.

In other words, the users use their respective spread spectrum codes to spread spectrum when transmitting the feedback information.

Step 103: scheduling user data transmission according to the user scheduling request(s).

The AP schedules user data transmission according to the user scheduling request(s) when receiving the user scheduling request(s).

After receiving the users' feedback, the AP obtains the user scheduling requests corresponding to users, and will process the data transmission of the user group: if there is only one user that need to transmit data, the transmissions may be conducted according to 802.11n or 802.11ac; if there are multiple users need to transmit, the transmissions may be conducted successively via scheduling by the AP, such as in a time-division manner; or, the transmission may be conducted simultaneously in a frequency-division manner, where each user is allocated with a certain bandwidth; or, the transmission may be conducted in a manner of time-division and frequency-division, where each user is allocated with some resource blocks; or, the transmission may be conducted simultaneously in the manner of code division, and of course the transmission may be conducted in other manners, to which the embodiments makes no restriction.

Optionally, in another embodiment, and on the basis of the above embodiment, the method may also include: receiving feedback information transmitted by a user(s) with no data transmission in the user group in response to the multicast frame.

That is to say, in this embodiment, the users that need to transmit data in the user group may feed back the user scheduling request to the AP, and the users with no data transmission may also transmit feedback information of no data transmission to the AP, so as to facilitate the AP to determine which users need to transmit data and which do not in the user group.

Figure 1A:
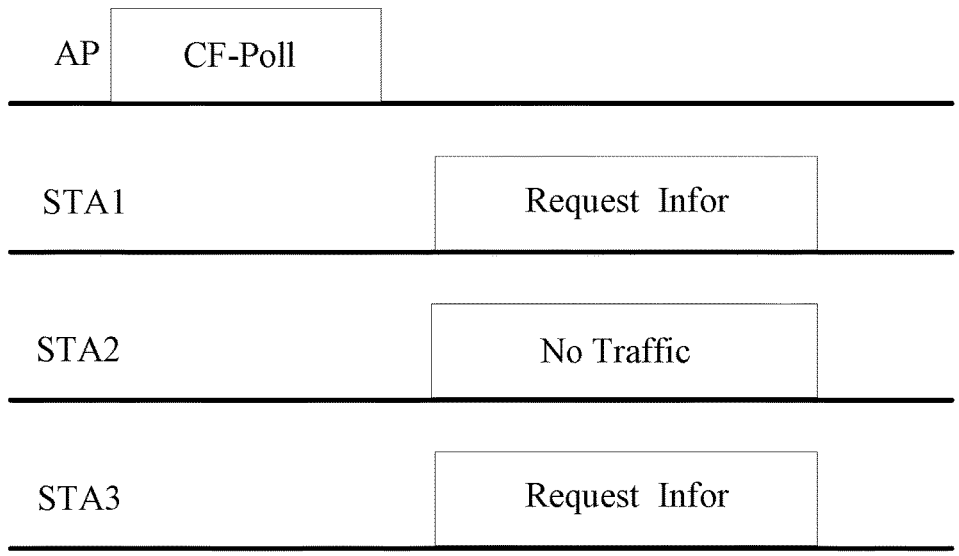
FIG. 1A is a schematic diagram of a case in which all users feed back information provided by an embodiment of the present disclosure.
Figure 1B:
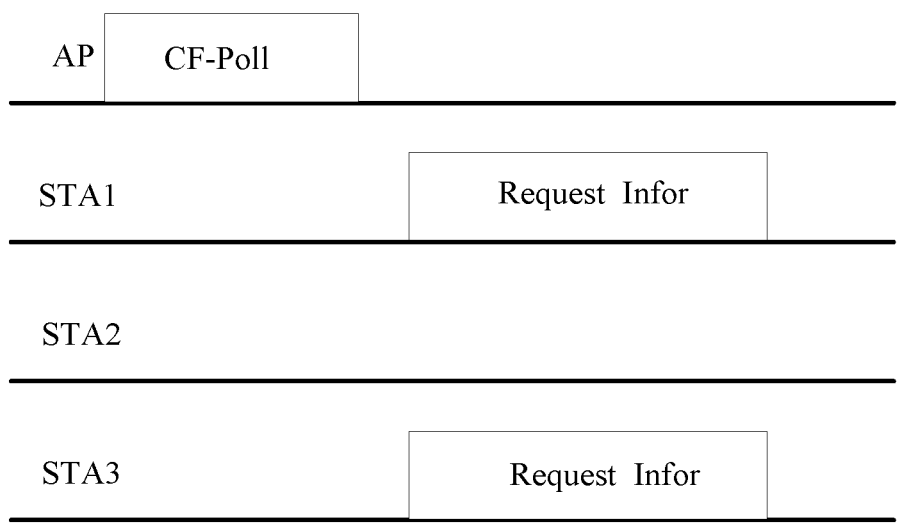
FIG. 1B is a schematic diagram of a case in which only users in need feed back information provided by an embodiment of the present disclosure.

Namely, in embodiments of the present disclosure, there are two feedback approaches: the first one is that all user feed back information, as shown in FIG. 1A, which is a schematic diagram of a case in which all users feed back information provided by an embodiment of the present disclosure; and the second one is that the users that need to transmit data feed back information, as shown in FIG. 1B, which is a schematic diagram of a case in which only users in need feed back information provided by an embodiment of the present disclosure.

As shown in FIG. 1A, assuming that STA1, STA2 and STA3 form a group, after receiving a CF-Poll (CF-Poll) from the AP, if STA1 and STA3 have traffic need to be transmitted while STA2 does not have, according to the feedback approach 1, STA1, STA2 and STA3 all need to feed back information, where STA1 and STA3 feed back scheduling request information (i.e., Request Infor), and STA2 feeds back information of "no traffic to be transmitted" (i.e. No Traffic).

As shown in FIG. 1B, assuming that STA1, STA2 and STA3 form a group, after receiving the CF-Poll from the AP, both STA1 and STA3 have traffic to be transmitted while STA2 does not have, according to the feedback approach 2, STA1 and STA3 feed back scheduling request information (i.e., Request Infor), and STA2 feeds back no information.

Before transmitting the feedback information, the user uses their respective spread spectrum codes to spread spectrum, so that the AP can correctly distinguish each user's feedback information.

In embodiments of the present disclosure, it is able to poll multiple users each time, thus the probability of invalid poll is reduced, besides, the user scheduling requests of multiple users can be acquired simultaneously, and user data transmissions can be scheduled based on the user scheduling requests, thereby reducing the delay of users with data transmission, and improving the quality of service for the system.

Embodiments of the disclosure improve the polling mechanism in IEEE 802.11n and IEEE 802.11ac, reduce the probability of invalid poll of AP, and increase the throughput of the system, and at the same time, efficiently reduce the delay of users with data transmission and improve the quality of service for the system.

Figure 2:
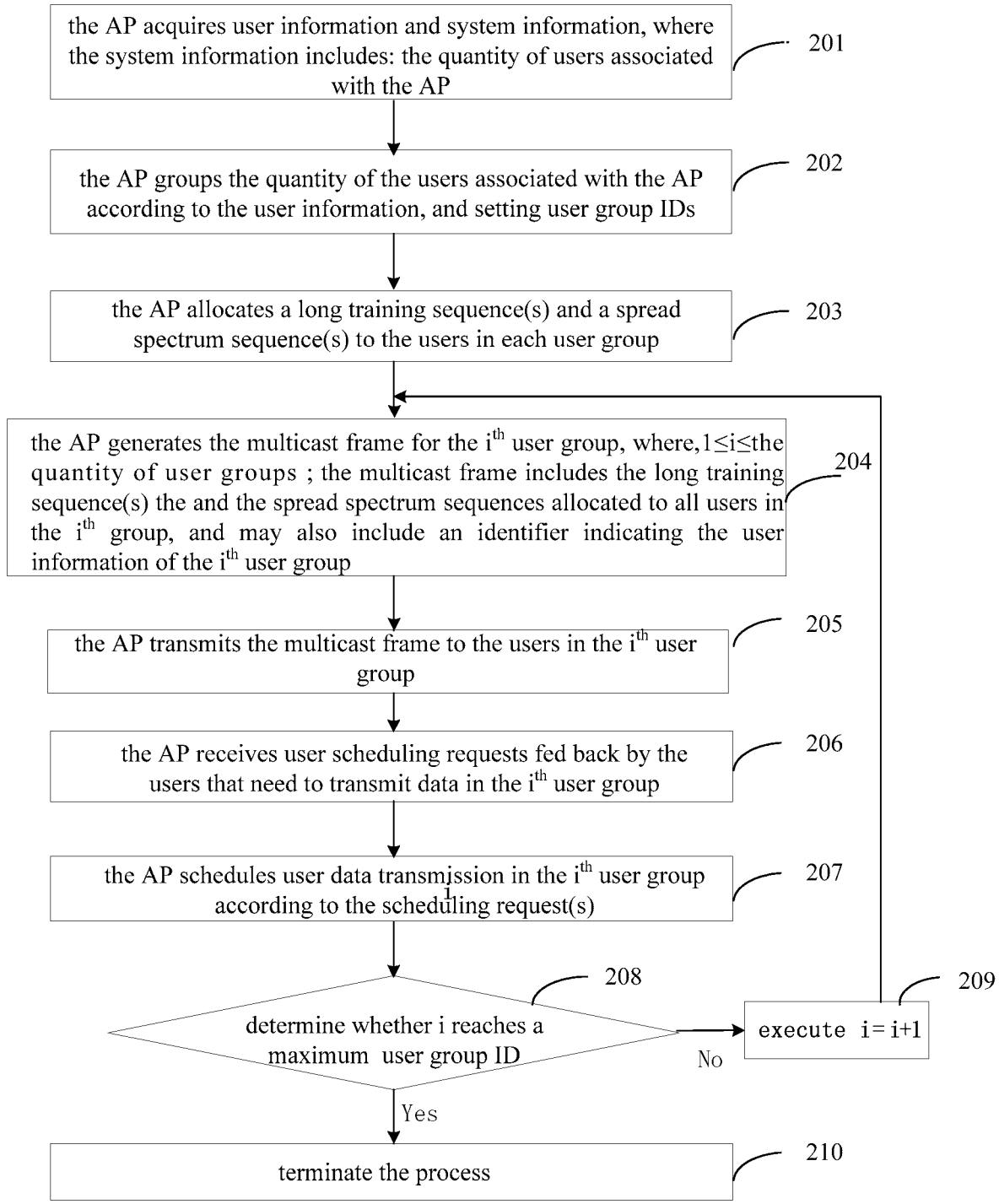
FIG. 2 is a schematic diagram of an implementation of a method for user data transmission provided by an embodiment of the present disclosure.

Referring to FIG. 2, which is a flow chart of an implementation of a method for user data transmission provided by an embodiment of the present disclosure, where the method includes the follow steps:

Step 201: the AP acquires user information and system information, where the system information includes: the quantity of users associated with the AP;

where, please make reference to the above description for details of the user information which will not be repeated here.

Step 202: the AP groups the quantity of the users associated with the AP according to the user information, and setting user group IDs;

where the grouping approach varies according to the user information containing different contents, please make reference to the above description for details which will not be repeated anymore.

Step 203: the AP allocates a long training sequence(s) and a spread spectrum sequence(s) to the users in each user group;

where, please make reference to the above description for details of the process of allocating the long training sequence(s) and spread spectrum sequence(s) refer to the above description which will not be repeated anymore.

Step 204: the AP generates the multicast frame for the $i^{th}$ user group, where, 1≤i≤the quantity of user groups; the multicast frame includes the long training sequence(s) the and the spread spectrum sequences allocated to all users in the $i^{th}$ group, and may also include an identifier indicating the user information of the $i^{th}$ user group;

Step 205: the AP transmits the multicast frame to the users in the $i^{th}$ user group;

Step 206: the AP receives user scheduling requests fed back by the users that need to transmit data in the $i^{th}$ user group;

Of course, in this embodiment, the AP may also receive feedback information transmitted by users that has no data to be transmitted.

In embodiments of the disclosure, the users have two feedback approaches: one is that all user feed back information; the other is that only the users with data feed back information, please make reference to the above for details which will not be repeated anymore. For the AP, feedback information transmitted by all users is received, or only feedback information from the users that need to transmit data is received.

Step 207: the AP schedules user data transmission in the $i^{th}$ user group according to the scheduling request(s);

Step 208: determine whether i reaches a maximum user group ID, if not, execute step 209; and if yes, execute step 210;

Step 209: execute i=i+1, then return to step 204, i.e., the AP generates the multicast frame for the $i^{th}$ user group, where the multicast frame includes an identifier indicating the user information of the $i^{th}$ user group, and also the long training sequence(s) and the spread spectrum sequences allocated to all users in the $i^{th}$ user group;

Step 210: terminate the process.

Figure 3:
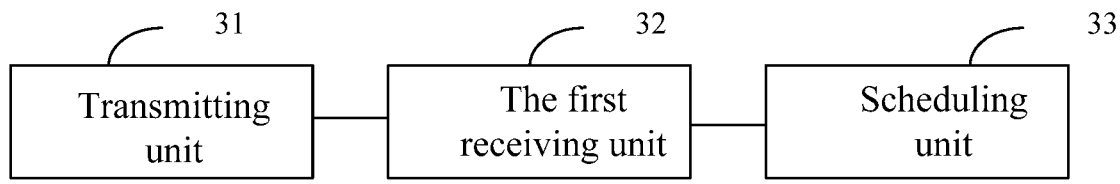
FIG. 3 is a schematic structure diagram of an apparatus for user data transmission provided by an embodiment of the present disclosure.

Based on the implementation procedure of the methods, embodiments of the present disclosure also provide an apparatus for user data transmission, the schematic diagram of the structure of which is shown in FIG. 3, and the apparatus includes a transmitting unit 31, a first receiving unit 33 and a scheduling unit 33.

Where the transmitting unit 31 is configured to transmit a multicast frame for acquiring the user scheduling request(s) to users in a predetermined user group, where the multicast frame includes a long training sequence(s) and a spread spectrum sequence(s) allocated to the users in the user group;

Optionally, the multicast frame transmitted by the transmitting unit may also include: an identifier indicating the user information of the user group, namely: a target user field of the transmitted multicast frame includes the identifier indicating the user information of the user group. The identifier indicating the user information of the user group transmitted by the transmitting unit includes a group ID of the user group, AID information of the users in the user groups, or a base sequence identifier of the long training sequence of the users in the user groups.

The first receiving unit 32, is configured to receive the user scheduling request(s) fed back by a user(s) with data to transmit in the user group; where the user scheduling request(s) is fed back by the user(s) using the long training sequence(s) and/or the spread spectrum sequence(s) allocated to the user.

The scheduling unit 33 is configured to schedule user data transmission according to the user scheduling request(s).

Figure 4:
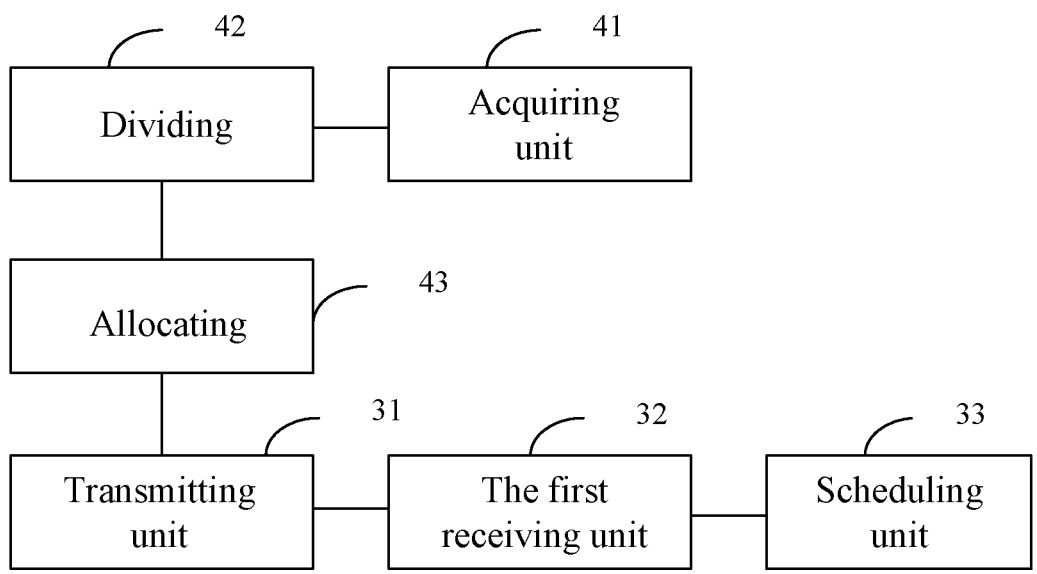
FIG. 4 is another schematic structure diagram of an apparatus for user data transmission provided by an embodiment of the present disclosure.

Optionally, on the basis of the embodiment illustrated by FIG. 3, the apparatus may also include: an acquiring unit 41, a dividing unit 42 and an allocating unit 43, the structure of which is schematically illustrated in FIG. 4, and FIG. 4 is another schematic structure diagram of an apparatus for user data transmission provided by an embodiment of the present invention, where the acquiring unit 41 is configured to acquire user information and system information, where the system information includes: the quantity of users associated with the AP;

the dividing unit 42 is configured to group the quantity of the users associated with the AP according to the user information, and set user group IDs; and the allocating unit 43 is configured to allocate a long training sequence(s) and a spread spectrum sequence(s) to users in each user group.

Optionally, the user information acquired by the acquiring unit includes traffic type of user, association identifier information (AID) of user and/or location information of user.

The dividing unit includes: a first dividing unit, a second dividing unit or a third dividing unit, where the first dividing unit is configured to group the users associated with the AP according to the traffic type of user; the second dividing unit is configured to group the users associated with the AP according to the AID information of user; and the third dividing unit is configured to group the users associated with the AP according to the location information of user.

Optionally, the allocating unit includes: a long training sequence allocating unit and a spread spectrum sequence allocating unit, where the long training sequence allocating unit is configured to allocate a same long training sequence to all users, or, select different base sequences as the long training sequences for different user groups; and use different shifts of a same base sequence as the long training sequences for different users in the same group.

The spread spectrum sequence allocating unit is configured to allocate orthogonal spread spectrum sequences to each user in the same user group; and allocate orthogonal spread spectrum sequences or non-orthogonal spread spectrum sequences, or a same spread spectrum sequence to users in different user groups.

Figure 5:
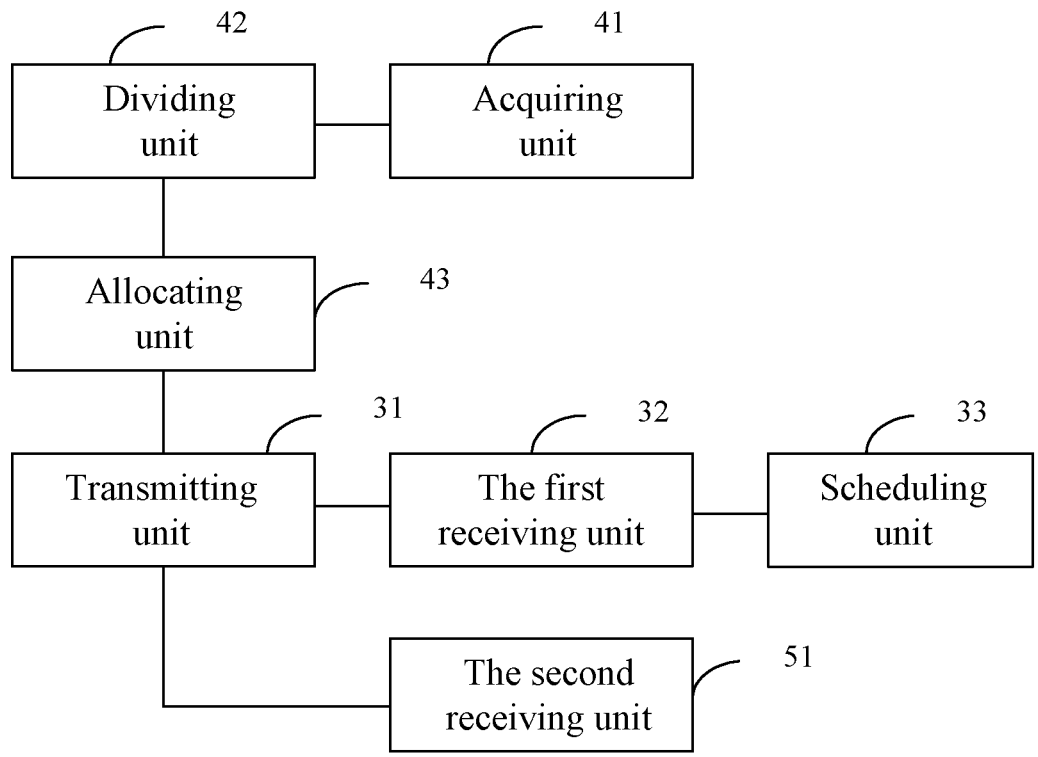
FIG. 5 is another schematic structure diagram of an apparatus for user data transmission provided by an embodiment of the present disclosure.

Optionally, the apparatus may also include a second receiving unit 51, the structure of which is schematically illustrated by FIG. 5, and FIG. 5 is another schematic structure diagram of an apparatus for user data transmission provided by an embodiment of the present disclosure.

The second receiving unit 51 is connected with the transmitting unit 31 and configured to receive the feedback information transmitted by a user(s) without data transmission in response to the multicast frame in the user group.

Where the second receiving unit may be integrated with the first receiving unit, or be deployed independently, to which the embodiment makes no restriction.

Optionally, the apparatus may be integrated with the AP or be deployed independently, to which the embodiment makes no restriction.

Figure 6:
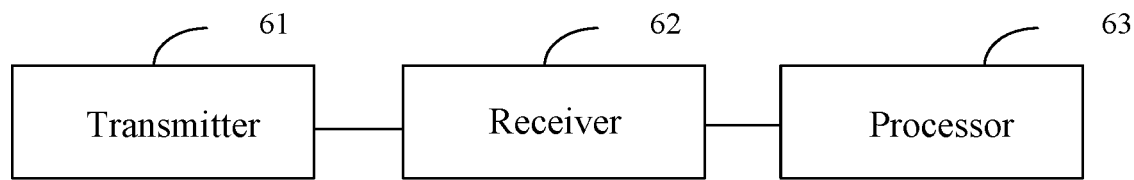
FIG. 6 is a schematic structure diagram of a network device provided by an embodiment of the present disclosure.

Referring to FIG. 6, which illustrates a network device provided by an embodiment of the present disclosure, the network device includes a transmitter 61, a receiver 62 and a processor 63.

The transmitter 61 is configured to transmit a multicast frame for acquiring the user scheduling request to users in a user group, where the multicast frame includes a long training sequence and spread spectrum sequences allocated to all users in the user group, and of course, the multicast frame may also include an identifier indicating user information of the user group.

The receiver 62 is configured to receive the user scheduling request(s) fed back by a user(s) with data transmission in the user group, where the user scheduling request(s) is fed back by the user(s) using at least one of the long training sequence(s) and the spread spectrum sequence(s) allocated to the user(s).

The processor 63 is configured to schedule user data transmission according to the user scheduling request(s) received by the transmitter.

Optionally, the receiver 62 is also configured to acquire user information and system information, where the system information includes: the quantity of users associated with the AP.

The processor 63 is also configured to group the quantity of the users associated with the AP according to the user information, and set user group IDs; and allocate a long training sequence(s) and a spread spectrum sequence(s) to users in each user group.

Optionally, the user information received by the receiver 62 includes traffic type of user, association identifier information (AID) of user or location information of user; and the grouping the quantity of the users associated with the AP according to the user information by the processor 63 includes: grouping the quantity of the users associated with the AP according to the traffic type of user; grouping the quantity of the users associated with the AP according to the AID information of user; and grouping the quantity of the users associated with the AP according to the location information of user.

Optionally, the allocating the long training sequence(s) to the users in each user group by the processor 63, includes: allocating a same long training sequence to the users in all user groups; or, allocating different long training sequences to different users. The allocating different long training sequences to different users by the processor includes: selecting different base sequences as the long training sequences for different user groups by the processor, and using different shifts of a same base sequence as the long training sequences for different users in a same user group by the processor.

Optionally, the allocating spread spectrum sequences to users in each user group by the processor 63 includes: allocating, by the processor, orthogonal spread spectrum sequences to the users in the same user group; allocating orthogonal spread spectrum sequences or non-orthogonal spread spectrum sequences, or a same spread spectrum sequence to users in different user groups.

Optionally, the multicast frame transmitted by the transmitter 61 includes an identifier indicating the user information of the user groups, where the target user field of the multicast frame includes the identifier indicating the user information of the user group.

Where the identifier indicating the user information of the user group includes traffic type of user, AID information of user in the user group or a base sequence identifier of the long training sequence of users in the user group.

Optionally, the receiver 62 is also configured to receive the feedback information transmitted by a user without data transmission in response to the multicast frame in the user group.

Optionally, the network device may be an access point (AP), and of course, may also be other similar device, to which the embodiment makes no restriction.

The technical scheme for acquiring the user scheduling request provided by embodiments of the present disclosure may also be applied in a wireless local area network system represented by the Wi-Fi, including IEEE 802.11a/b/g, 802.11n, 802.11ac and the next generation Wi-Fi system, so as to improve the performance of the wireless network, where the application scenarios may be office business, stadiums or home wireless local area network and the like.

It should be noted that, in the disclosure, the relational terms such as the first, the second and the like are merely used to distinguish one entity or one operation from another entity or another operation, without necessarily requiring or suggesting that any of the aforementioned actual relationship or order exist among the entities or operations. Moreover, the terms "comprises", "includes" or any other derivatives thereof are intended to cover non-exclusive inclusion, so that the processes, the methods, the materials or the devices including a series of elements not only include those elements, but also include other elements that are not explicitly listed, or also include the elements that are inherent to the processes, the methods, the materials or the devices. The elements defined by the expression of "include(s)/comprise(s) a/an" don't exclude the presence of other similar elements in the processes, the methods, the materials or the equipment including the element, when there are no more restrictions imposed.

Through the above descriptions of the implementations, those skilled in the art can clearly know that the embodiments of the disclosure may be implemented via software plus essential universal hardware platform, and of course, through hardware, but in many cases the former one is a better way to implement the embodiments of the present disclosure. Based on this understanding, the substantial contents of the technical schemes of the present disclosure, in other words, the part that contributes to the prior art may be embodied in the form of software products, and the computer software products may be stored in a storage medium, such as the ROM/RAM, disk and CD-ROM, which includes several instructions allowing a computer device (for instance, a personal computer, a server, or a network device, etc.) to perform the method according to each embodiment or certain parts thereof of the present disclosure.

The description above are merely preferable implementations of the present disclosure, and it should be pointed out that, for those skilled in the art, a number of modifications and changes can be made without departing from the principle of the present disclosure, and all of these modifications and changes still fall within the protection scope of the present disclosure.

What is claimed is:

1. A method for user data transmission, comprising: transmitting a multicast frame for acquiring at least one user scheduling request to a plurality of users with adjacent association identifier information (AIDs), wherein the multicast frame comprises first information used for indicating the plurality of users with adjacent AIDs and second information used for indicating at least one long training sequence allocated to the plurality of users with adjacent AIDs; the first information comprises an initial AID of the plurality of users with the adjacent AIDs and third information used for indicating a quantity of the plurality of users with adjacent AIDs, and wherein the first information does not comprise a bitmap to indicate whether each user in the plurality of users is acquired to transmit a user scheduling request and the first information does not comprise other AIDs except the initiating AID; receiving the at least one user scheduling request fed back by at least one user with data transmission in the plurality of users with adjacent AIDs, wherein the at least one user scheduling request is fed back by the at least one user using the at least one long training sequence allocated to the at least one user; scheduling the user data transmission according to the at least one user scheduling request; wherein the multicast frame further comprising fourth information used for indicating at least one spread spectrum sequence allocated to the plurality of users with adjacent AIDs, and wherein spread spectrum sequences, allocated to the plurality of users and used for transmitting the user scheduling request, are used to distinguish each user's user scheduling request.

2. The method according to claim 1, wherein long training sequences allocated to the plurality of users with adjacent AIDs are used to distinguish each user's user scheduling request.

3. An apparatus for user data transmission, comprising: a transmitting unit, configured to transmit a multicast frame for acquiring at least one user scheduling request to a plurality of users with adjacent association identifier information (AIDs), wherein the multicast frame comprises first information used for indicating the plurality of users with adjacent AIDs and second information used for indicating at least one long training sequence allocated to the plurality of users with adjacent AIDs; the first information comprises an initial AID of the plurality of users with the adjacent AIDs and third information used for indicating a quantity of the plurality of users with adjacent AIDs, and wherein the first information does not comprise a bitmap to indicate whether each user in the plurality of users is acquired to transmit a user scheduling request and the first information does not comprise other AIDs except the initiating AID; a first receiving unit, configured to receive the at least one user scheduling request fed back by at least one user with data transmission in the plurality of users with adjacent AIDs, wherein the at least one user scheduling request is fed back by the at least one user using the at least one long training sequence allocated to the at least one user; a scheduling unit, configured to schedule user data transmission according to the at least one user scheduling request; wherein the multicast frame further comprising fourth information used for indicating at least one spread spectrum sequence allocated to the plurality of users with adjacent AIDs; wherein spread spectrum sequences, allocated to the plurality of users and used for transmitting the user scheduling request, are used to distinguish each user's user scheduling request.

4. The apparatus according to claim 3, wherein long training sequences allocated to the plurality of users with adjacent AIDs are used to distinguish each user's user scheduling request.

5. A network device, comprising: a transmitter, configured to transmit a multicast frame for acquiring at least one user scheduling request to a plurality of users with adjacent association identifier information (AIDs), wherein the multicast frame comprises first information used for indicating the plurality of users with adjacent AIDs and second information used for indicating at least one long training sequence allocated to the plurality of users with adjacent AIDs; the first information comprises an initial AID of the plurality of users with the adjacent AIDs and third information used for indicating a quantity of the plurality of users with adjacent AIDs, and wherein the first information does not comprise a bitmap to indicate whether each user in the plurality of users is acquired to transmit a user scheduling request and the first information does not comprise other AIDs except the initiating AID: a receiver, configured to receive the at least one user scheduling request fed back by at least one user with data transmission in the plurality of users with adjacent AIDs, wherein the at least one user scheduling request is fed back by the at least one user using the at least one long training allocated to the at least one user; a processor, configured to schedule user data transmission according to the at least one user scheduling request received by the receiver; wherein the multicast frame further comprising fourth information used for indicating at least one spread spectrum sequence allocated to the plurality of users with adjacent AIDs, and wherein spread spectrum sequences, allocated to the plurality of users and used for transmitting the user scheduling request, are used to distinguish each user's user scheduling request.

6. The network device according to claim 5, wherein long training sequences allocated to the plurality of users with adjacent AIDs are used to distinguish each user's user scheduling request.

7. A method for user data transmission at a user side, comprising: receiving a multicast frame transmitted by a network device, wherein the multicast frame is for acquiring at least one user scheduling request in a plurality of users with adjacent association identifier information (AIDs) and the plurality of users with adjacent AIDs includes the user, the multicast frame comprises first information used for indicating the plurality of users with adjacent AIDs and second information used for indicating at least one long training sequence allocated to the plurality of users with adjacent AIDs; the first information comprises an initial AID of the plurality of users with the adjacent AIDs and third information used for indicating a quantity of the plurality of users with adjacent AIDs, and wherein the first information does not comprise a bitmap to indicate whether each user in the plurality of users is acquired to transmit a user scheduling request and the first information does not comprise other AIDs except the initiating AID; transmitting a user scheduling request to the network device if the user needs to transmit data, wherein the user scheduling request is fed back by the user using a long training sequence allocated to the user; wherein the multicast frame further comprising fourth information used for indicating at least one spread spectrum sequence allocated to the plurality of users with adjacent AIDs, and wherein spread spectrum sequences, allocated to the plurality of users and used for transmitting the user scheduling request, are used to distinguish each user's user scheduling request.

8. The method according to claim 7, wherein long training sequences allocated to the plurality of users with adjacent AIDs are used to distinguish each user's user scheduling request.

* * * * *